Patented Sept. 26, 1922.

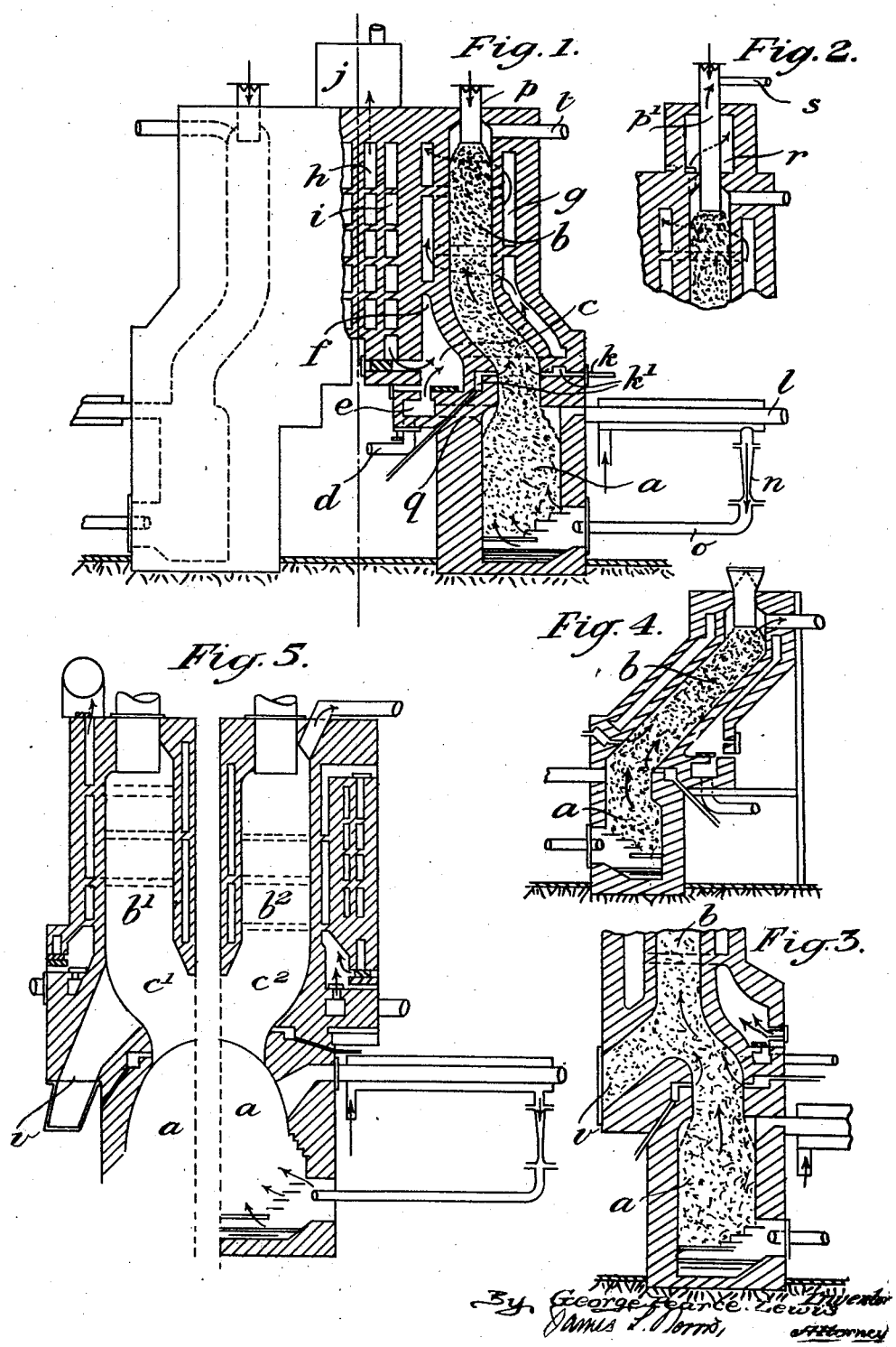

1,430,452

UNITED STATES PATENT OFFICE.

GEORGE PEARCE LEWIS, OF LONDON, ENGLAND.

COMBINED GAS GENERATOR AND RETORT APPARATUS.

Application filed February 13, 1922. Serial No. 536,307.

*To all whom it may concern:*

Be it known that I, GEORGE PEARCE LEWIS, a subject of the King of Great Britain, residing in London, England, have invented certain new and useful Improvements in Combined Gas Generator and Retort Apparatus, of which the following is a specification.

The invention relates to known apparatus for distilling and gasifying solid carbonaceous matter, such as coal, shales, lignite, peat, wood, etc., in which the distillation and gasification is effected in a combined retort and generator, the distillation taking place in the retort and producer gas being formed in the generator. Steam and air are admitted below the grate and a part of the gases produced in the generator passes upwards through the retort. The gases from the retort, rich in condensible hydrocarbons and containing some ammonia, are led through an oil and ammonia recovery plant before being used for heating or power purposes.

A portion of the gas from the generator, usually rich in ammonia, is led to an ammonia recovery plant and after removal of the ammonia may be used for heating or power purposes.

In these known apparatus it has been usual for the temperature of the retort not to exceed about 600° C., so that the distillation of the volatile constituents is not complete and some of the less volatile are retained in the coke.

According to the invention the temperature of the retort is progressively raised by the combustion in flues surrounding the retort of some of the producer gas so that the temperature progressively varies from about 200° C. in the upper portion of the retort to about 1300° C. in the lower portion and ensures the complete distillation of all the volatile constituents.

The raw fuel is fed into the retort almost continuously in any known or convenient way, but, preferably, under conditions which give a porous charge.

If the fuel is charged with excessive moisture or is capable of giving off upon heating objectionable proportions of carbonic acid gases, a long feeder pipe forming an extension of the retort is employed in known manner for the purpose of slowly preheating the raw fuels and thus avoiding troublesome disintegration by the too rapid expulsion of the water content and also for assisting in the pre-expulsion of the carbonic acid gas. The feeder pipe is surrounded by a supplementary heating chamber, a branch pipe from the feeder conveying the steam and carbonic acid gas to the moisture saturated air, to the generator, to the retort, to the chimney stack or to apparatus where they can be used in any suitable manner.

If the raw fuel, such as lignites, brown coal, peat, wood, and wood waste and the like yield on distillation a proportion of acid bodies, it is advisable to admix with the raw material, prior to its being charged into the retort, a portion up to 5 per cent of lime or the equivalent of other alkaline material in order to improve the quality of the oil matter distilled in the retort. On the other hand, when quantity irrespective of quality is the chief consideration, it is sometimes advisable to admix sawdust and like bodies with certain coals, cannels and the older lignites.

The flues surrounding the retorts are usually heated by the combustion of gases from the recovery plant after the ammonia and hydrocarbons are removed, but when the raw material is very poor in nitrogen it may be advisable to provide for a proportion of the producer gases passing directly from the generator to a combustion chamber.

The setting may be provided with recuperative flues for preheating the secondary air. The waste gases from the setting or recuperator are preferably used to heat a steam boiler and superheater for the supply of superheated steam to the generator.

The distilled gases from the retort which are usually very rich in condensible hydrocarbons should be treated by a process of slow condensation in an appropriate form of condenser, arranged to avoid difficulties due to the deposition of wax and other semi-solid matter, or, alternatively, may be subjected to the action of any suitable mechanical device for the abstraction of condensible hydrocarbons and other liquid products and apparatus for the recovery of ammonia.

The accompanying drawings represent examples of constructions according to the invention. Fig. 1 is a part vertical section and end view of a combined retort and generator. Fig. 2 is a section of the upper part of a retort with long feed pipe and preheating chamber. Fig. 3 is a part section showing means for the withdrawal of coke. Fig. 4 is a cross section of a setting with inclined retorts, Fig. 5 shows a twin retort combined with a generator.

Referring to Fig. 1, $a$ is a generator provided with any convenient form of grate, preferably with mechanical means for the removal of ashes, $b$ is a retort, preferably oblong in plan, wherein the raw carbonaceous matter is protectively and progressively distilled. $c$ is the curved junction between the retort and the generator, $d$ is a pipe conveying a portion of the gases from the recovery plant to distributing flues $e$ which are provided with gas nozzles and dampers. $f$ is a combustion chamber, $g$ spiral heating flues surrounding the retort, $h$ waste gas flues for heating the secondary air in air flues $i$. A boiler with steam superheater $j$ is heated by the waste heat from the retorts setting and supplies steam to the generator and retorts. Pipes $k$ supply superheated steam or other gases to distributing passages $k'$. Part of the producer gas formed in the generator $a$ passes through an outlet $l$ and is used for motive or other purposes and preheats the moisture-saturated blast admitted to the generator through a pipe $o$; $n$ represents a steam jet blast, inducer or fan.

The feed pipe for the raw fuel is shown at $p$; $t$ is the outlet for the hydrocarbon gases from the retort.

The dotted lines in Fig. 1 represent a passage $q$ through which a portion of the gases produced in the generator $a$ is led to the distributing flues $e$.

In Fig. 2 the feed pipe $p'$ is lengthened and surrounded by a supplementary preheating chamber $r$, the moisture and deleterious gases from the pipe $p'$ being led away through a pipe $s$.

In Fig. 3, $v$ represents an opening at the lower end of the retort $b$ for the withdrawal of coke in cases where it is found advisable.

Fig. 4 shows a combined retort and generator in which the retort $b$ is inclined at an angle of 45° to the vertical generator $a$.

In Fig. 5, twin retorts $b'$, $b^2$ are combined through curved junctions $c'$, $c^2$ with a generator $a$ common to both retorts. An opening $v$ for the discharge of coke is shown in the retort $b'$. The retort $b^2$ is shown as provided with flues for preheating the secondary air.

Having thus described the nature of the said invention and the best means I know of carrying the same into practical effect, I claim:

1. Apparatus for distilling and gasifying solid carbonaceous matter, said apparatus comprising in combination a chamber, the lower portion of which forms a generator and the upper portion a retort, the axis of the generator being eccentric to the axis of the retort, means for admitting air and steam to the generator, a combustion chamber situated close to the lower portion of the retort, means for the admission of a moisture saturated blast to the generator and means for heating said blast by the producer gases generated in and withdrawn from the generator.

2. Apparatus for distilling and gasifying solid carbonaceous matter, said apparatus comprising in combination a chamber the lower portion of which forms a generator and the upper portion a retort, the axis of the generator being eccentric to the axis of the retort, means for admitting air and steam to the generator, a combustion chamber situated close to the lower portion of the retort. spiral flues surrounding the retort traversed by the products of combustion in said combustion chamber and means for admitting some of the gases from the generator to said combustion chamber after removal of the ammonia contained in said gases.

3. Apparatus for distilling and gasifying solid carbonaceous matter, said apparatus comprising in combination a chamber the lower portion of which forms a generator and the upper portion of a retort, the axis of the generator being eccentric to the axis of the retort, means for admitting air and steam to the generator, a combustion chamber situated close to the lower portion of the retort, flues surrounding the retort traversed by the products of combustion in said combustion chamber and means for admitting some of the gases from the generator to said combustion chamber after removal of the ammonia contained in said gases, other flues external to and closely adjacent to first-mentioned flues and traversed by secondary air, and a third set of flues traversed by the waste gases heating said secondary air.

4. Apparatus for distilling and gasifying solid carbonaceous matter, said apparatus comprising in combination a chamber, the lower portion of which forms a generator and the upper portion a retort, the axis of the generator being eccentric to the axis of the retort, means for admitting air and steam to the generator, a combustion chamber situated close to the lower portion of the retort, flues surrounding the retort traversed by the products of combustion in said combustion chamber and means for admitting some of the gases from the generator to said combustion chamber after removal of the ammonia contained in said gases, other flues external to and closely adjacent to first-mentioned flues and traverse by secondary air, a third set of flues traversed by the waste gases heating said secondary air, and a boiler heated by said waste gases supplying steam to the generator and retort.

5. Apparatus for distilling and gasifying solid carbonaceous matter, said apparatus comprising in combination a chamber, the lower portion of which forms a generator and the upper portion a retort, the axis of the generator being eccentric to the axis of the retort, means for admitting air and steam to the generator, a combustion chamber situated close to the lower portion of the retort, flues surrounding the retort traversed by the products of combustion in said combustion chamber and means for admitting some of the gases from the generator to said combustion chamber after removal of the ammonia contained in said gases, other flues external to and closely adjacent to first-mentioned flues and traversed by secondary air, a third set of flues traversed by the waste gases heating said secondary air, and a boiler and superheater heated by said waste gases supplying steam to the generator and retort.

6. Apparatus for distilling and gasifying solid carbonaceous matter comprising in combination a substantially vertically arranged chamber, the lower portion of which forms the generator and the upper portion the retort, means for admitting air and steam to the generator, a combustion chamber adjacent to the lower portion of the retort, flues surrounding the retort and traversed by the products of combustion in said combustion chamber, a feed pipe for admitting the carbonaceous matter into the top of the retort, a preheating chamber surrounding said pipe and means for removing moisture and deleterious gases from said pipe.

7. Apparatus for distilling and gasifying solid carbonaceous matter, said apparatus comprising twin vertical retort chambers, a vertical generator chamber connected to each of said retort chambers by a curved junction, means for supplying the generator with a preheated moisture saturated blast and means for the removal for power purposes of the producer gases generated in the generator.

8. Apparatus for distilling and gasifying solid carbonaceous matter comprising in combination a substantially vertically arranged chamber, the lower portion of which forms the generator and the upper portion the retort, means for admitting air and steam to the generator, a combustion chamber surrounding the lower portion of the retort, means for admitting part of the gases produced in the generator to said combustion chamber, flues surrounding the retort and traversed by the products of combustion in said combustion chamber, a feed pipe for admitting the carbonaceous matter into the top of the retort, a preheating chamber surrounding said pipe and means for removing moisture and deleterious gases from said pipe.

In testimony where of I have signed my name to this specification.

GEORGE PEARCE LEWIS.

Witness:
  T. J. OSMAN.